(12) United States Patent
Bouzakis et al.

(10) Patent No.: US 6,409,390 B1
(45) Date of Patent: Jun. 25, 2002

(54) COMPACT, PRECISION DUPLEX BEARING MOUNT FOR HIGH VIBRATION ENVIRONMENTS

(75) Inventors: George Elias Bouzakis; James Edward Bowman, both of Fort Wayne, IN (US); Edward J. Devine, Laurel, MD (US); Benjamin Joffe, Fort Wayne, IN (US); Kenneth Neal Segal, Ellicott City, MD (US); Merritt J. Webb, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 23 days.

(21) Appl. No.: 09/702,510

(22) Filed: Oct. 31, 2000

(51) Int. Cl.[7] .............................................. F16C 33/58
(52) U.S. Cl. ...................................... 384/517; 384/537
(58) Field of Search ................................ 384/517, 518, 384/563, 537, 542, 903

(56) References Cited

U.S. PATENT DOCUMENTS

| | | | |
|---|---|---|---|
| 4,364,615 A | * 12/1982 | Euler | 384/517 |
| 4,386,812 A | * 6/1983 | Anderson | 384/542 |
| 4,611,934 A | * 9/1986 | Piotrowski et al. | 384/517 |
| 5,624,193 A | * 4/1997 | Vogelsberger et al. | 384/517 |
| 6,123,462 A | * 9/2000 | Crowell | 384/517 |

* cited by examiner

*Primary Examiner*—Thomas R. Hannon
(74) *Attorney, Agent, or Firm*—Baker & Daniels

(57) ABSTRACT

A duplex bearing mount including at least one duplex bearing having an inner race and an outer race, the inner race disposed within the outer race and being rotatable relative to the outer race about an axis, the inner race having substantially no relative movement relative to the outer race in at least one direction along the axis, the inner and outer races each having first and second axial faces which are respectively located at the same axial end of the duplex bearing. The duplex bearing is radially supported by a housing, and a shaft extends through the inner race, the shaft radially and axially supported by the inner race. A first retainer is connected to the housing and engages the first axial surface of a bearing race, the movement of which race in a first direction along the axis being constrained by the first retainer. A second, resilient retainer is connected to the housing or the shaft and is deflected through engagement with the second axial face of a bearing race, the movement of which race in a second direction along the axis, opposite to the first direction, being constrained by the deflected second retainer. The bearing is preloaded by its being clamped between the first and second retainers, and the second retainer forms at least a portion of a spring having the characteristic of a substantially constant force value correlating to a range of various deflection values, whereby the preload of the bearing is substantially unaffected by variations in the deflection of the second retainer.

20 Claims, 12 Drawing Sheets

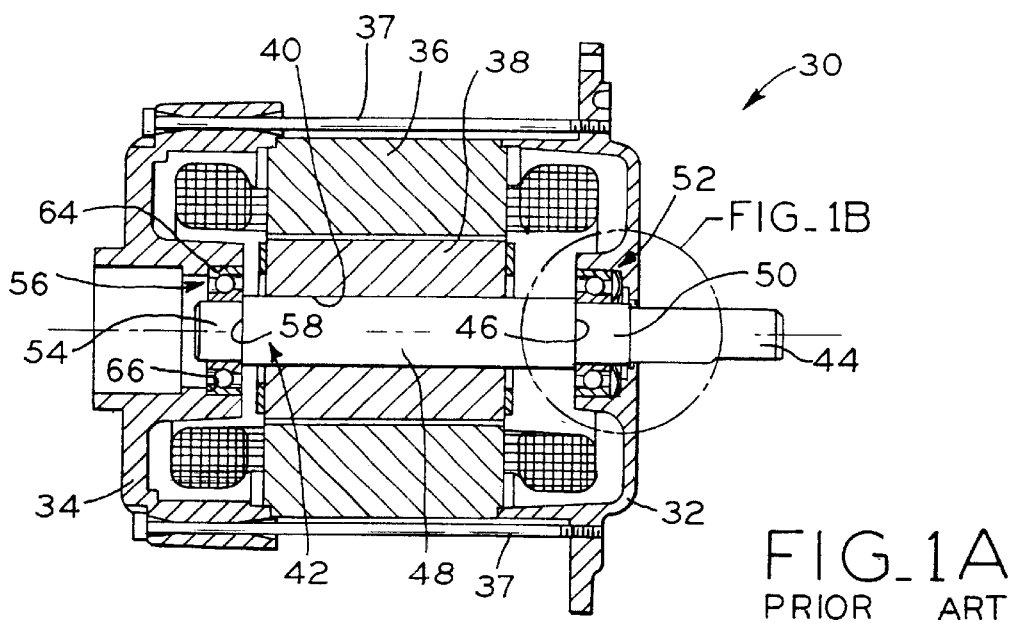
FIG_1A
PRIOR ART
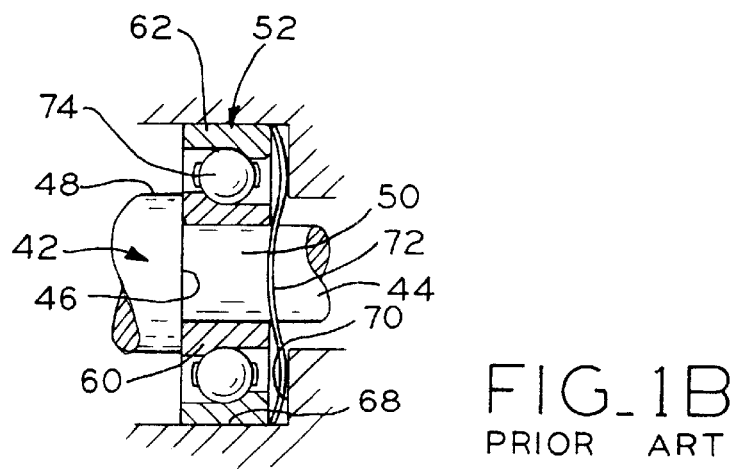
FIG_1B
PRIOR ART
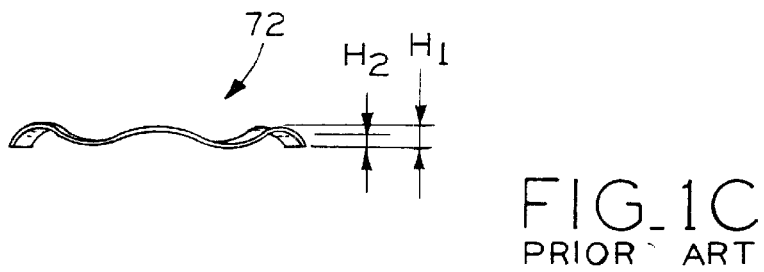
FIG_1C
PRIOR ART

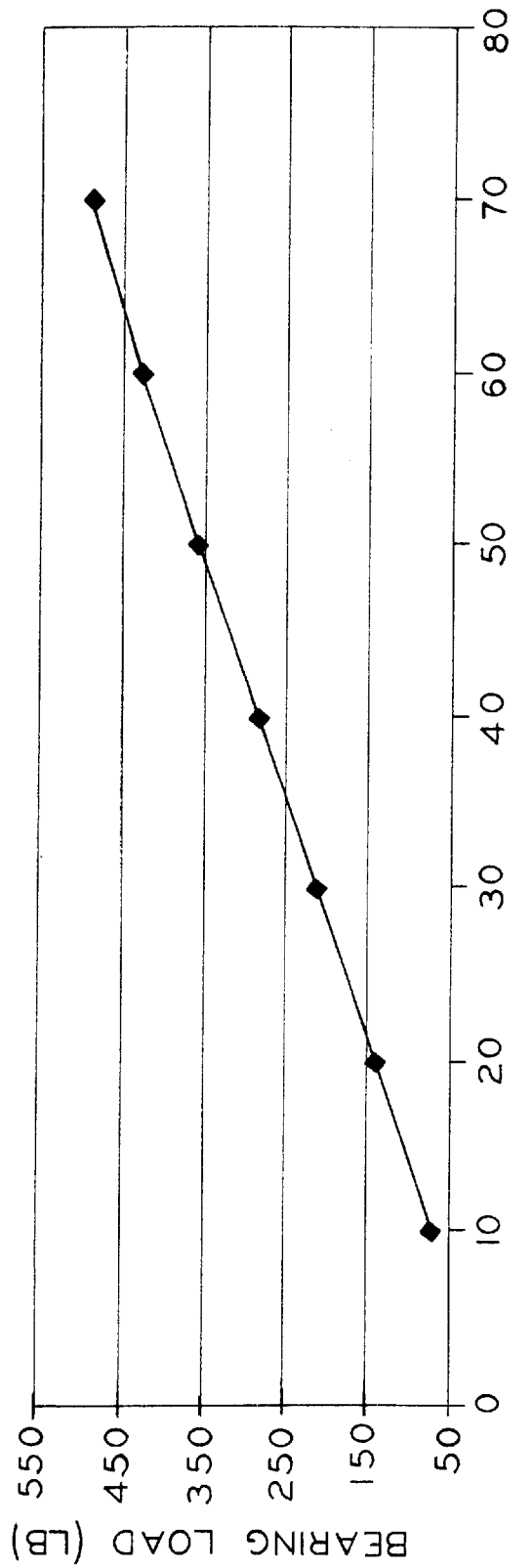
FIG_2
PRIOR ART

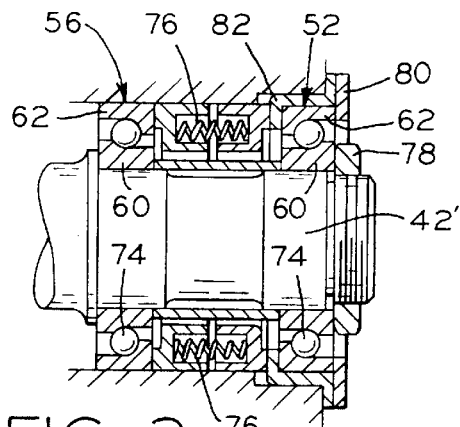
FIG_3
PRIOR ART
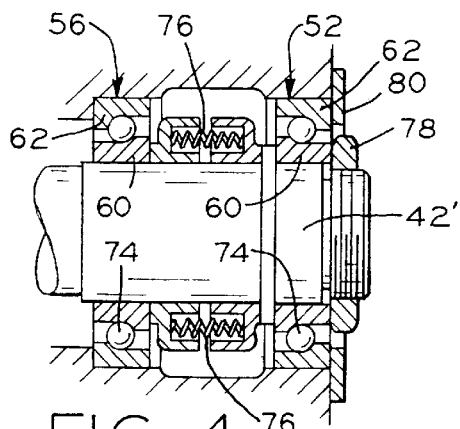
FIG_4
PRIOR ART
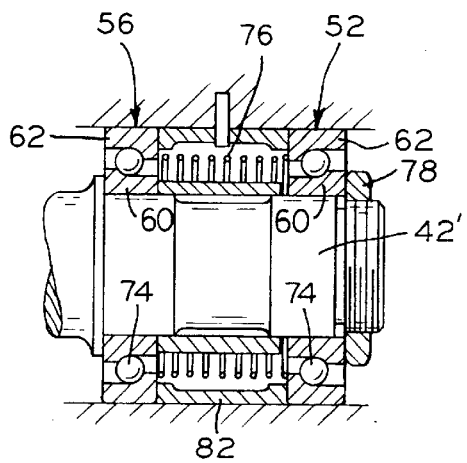
FIG_5
PRIOR ART
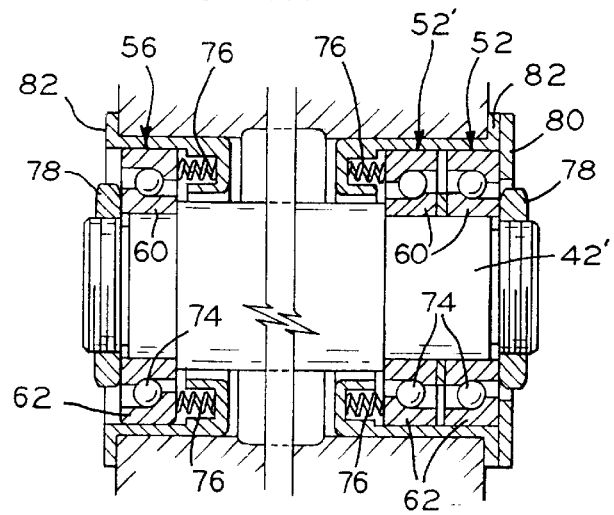
FIG_6
PRIOR ART
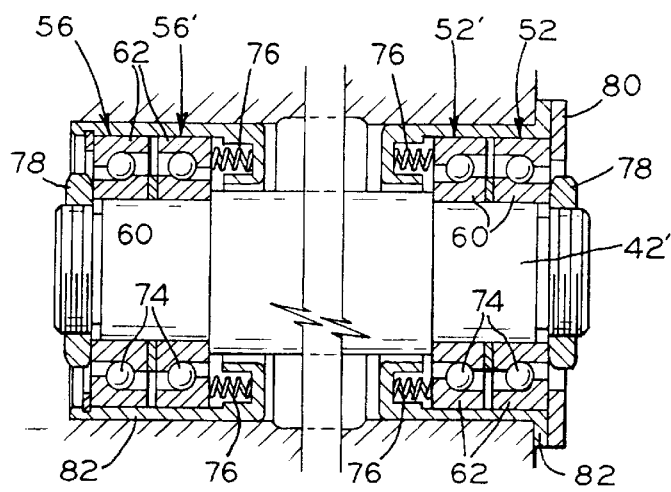
FIG_7
PRIOR ART

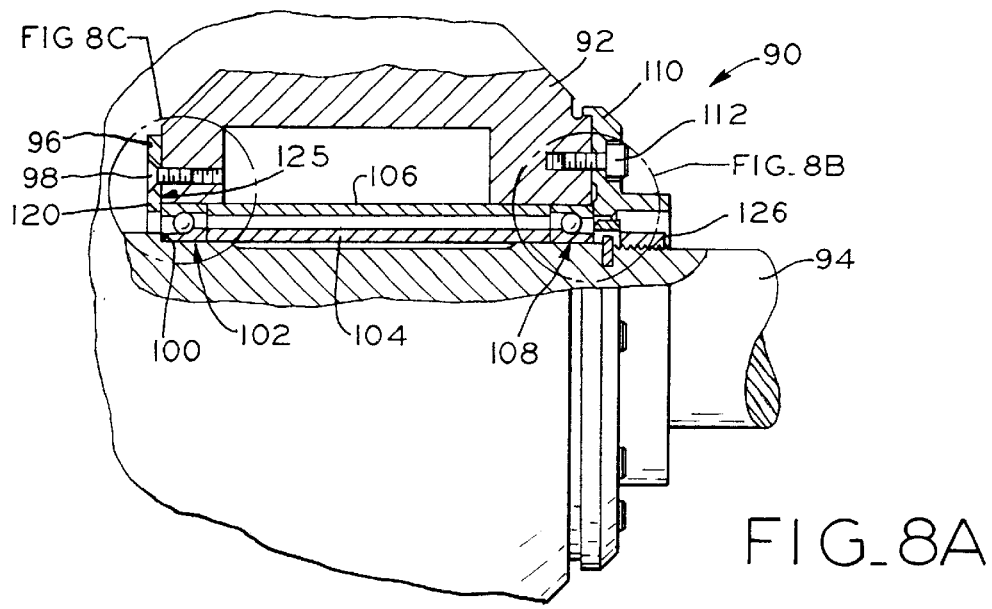
FIG_8A
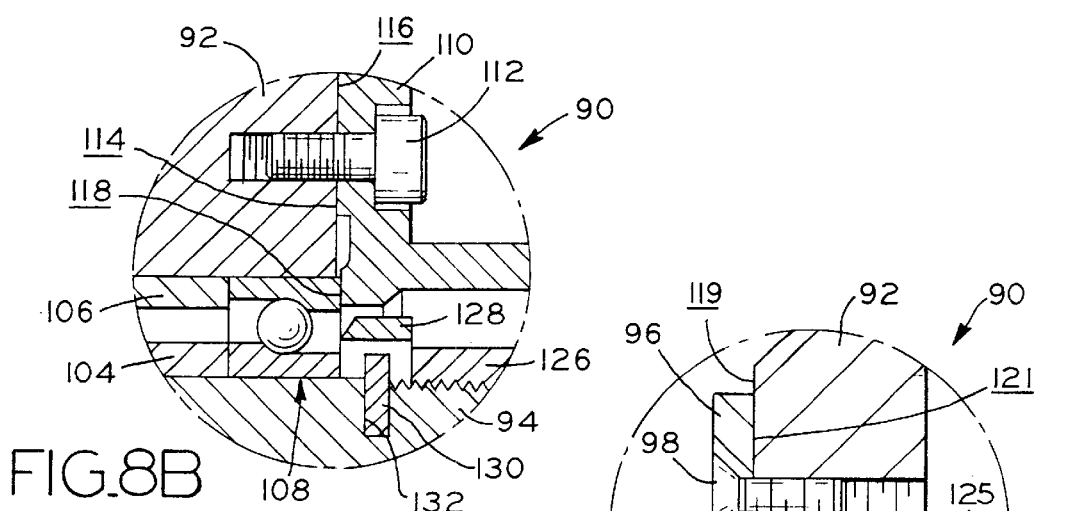
FIG_8B
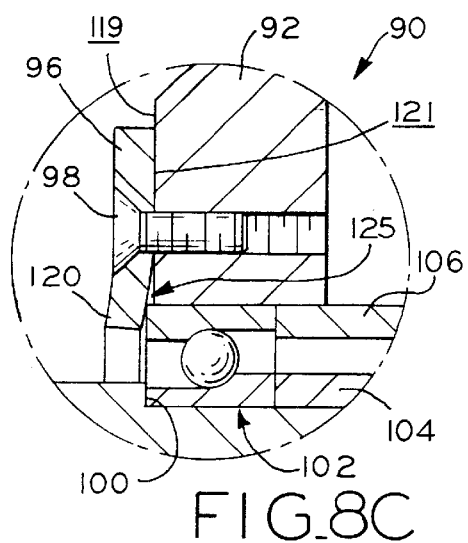
FIG_8C
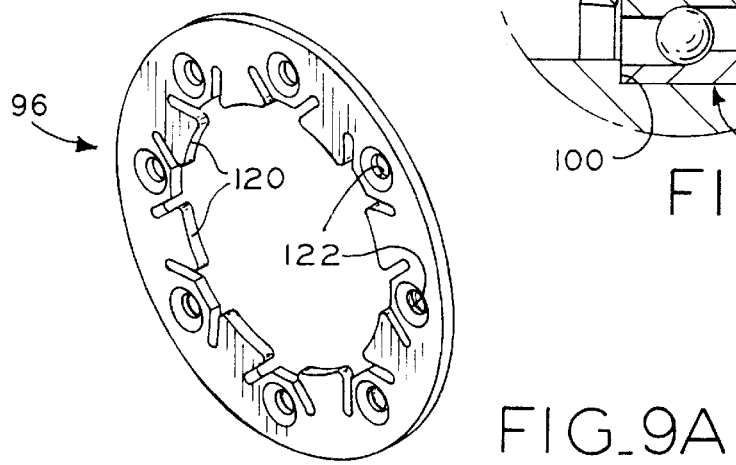
FIG_9A

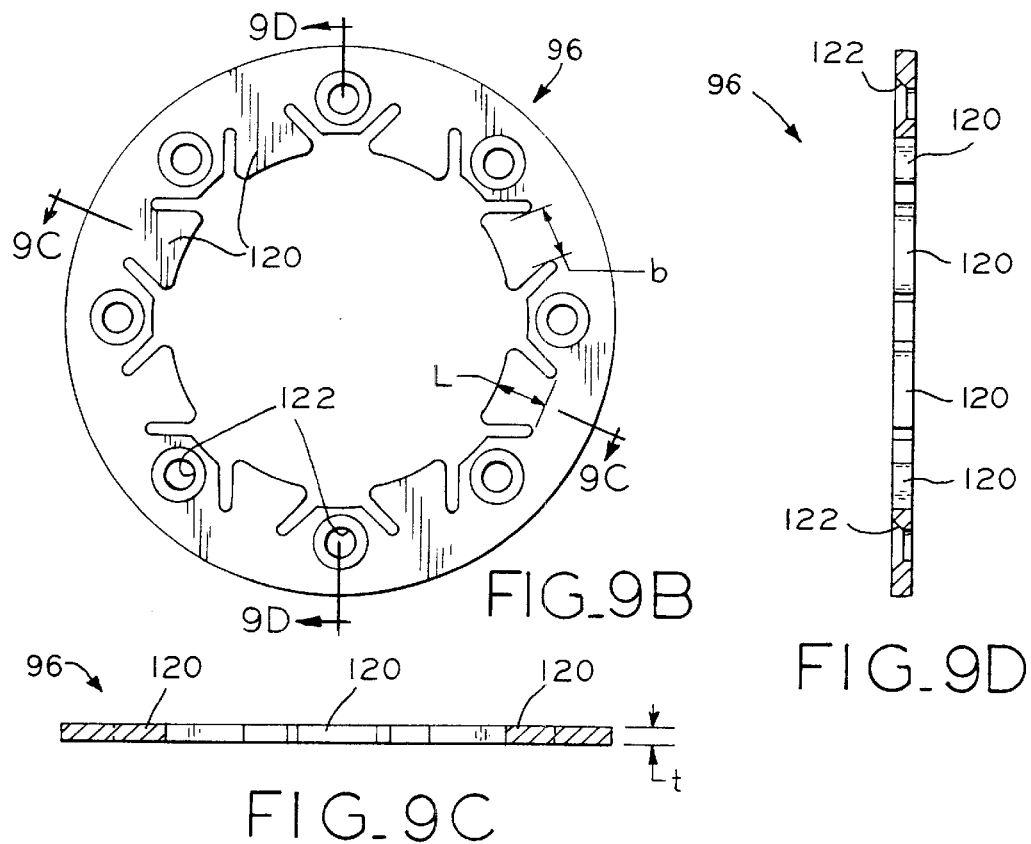
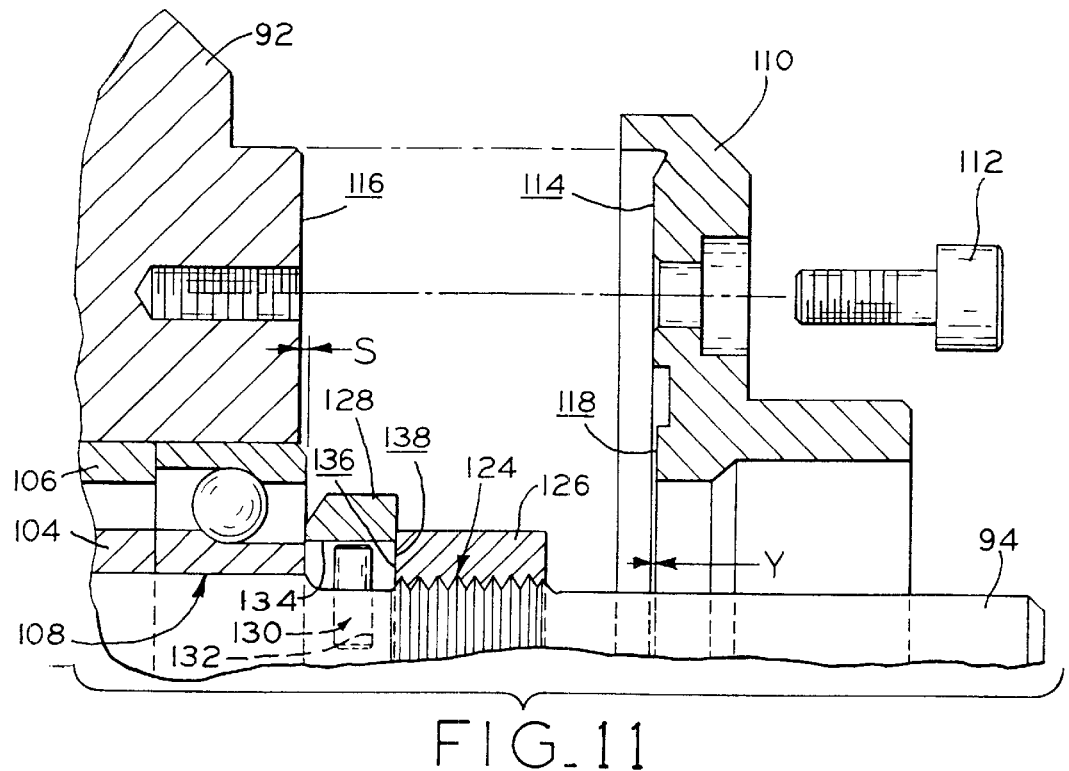

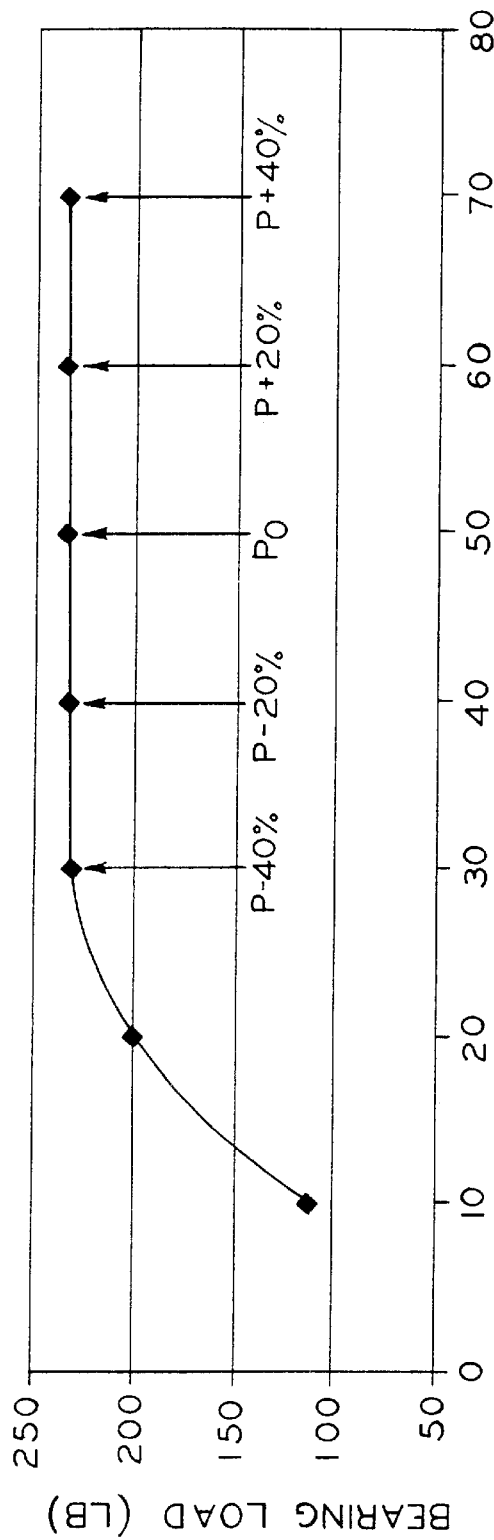
FIG_10

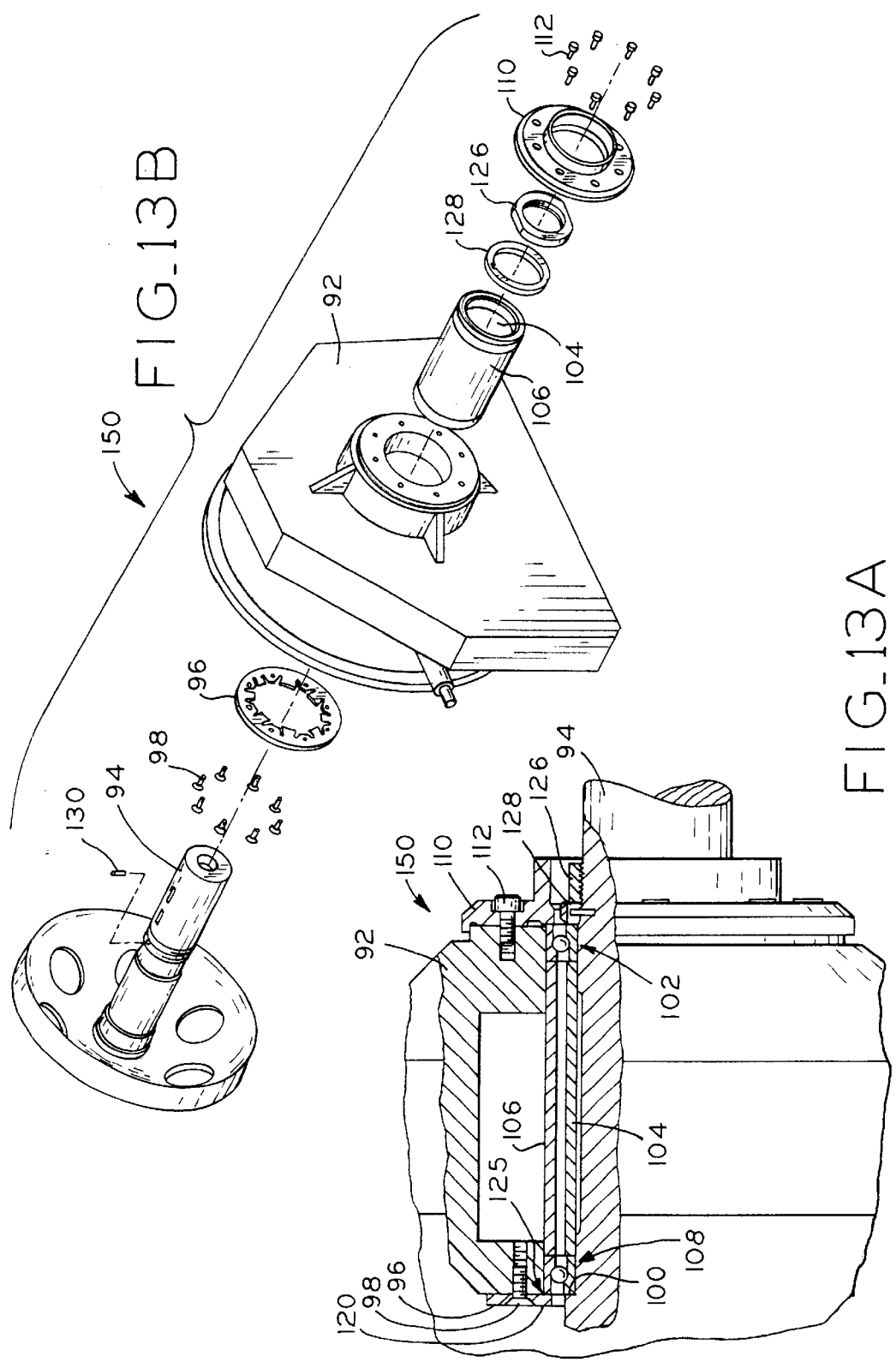

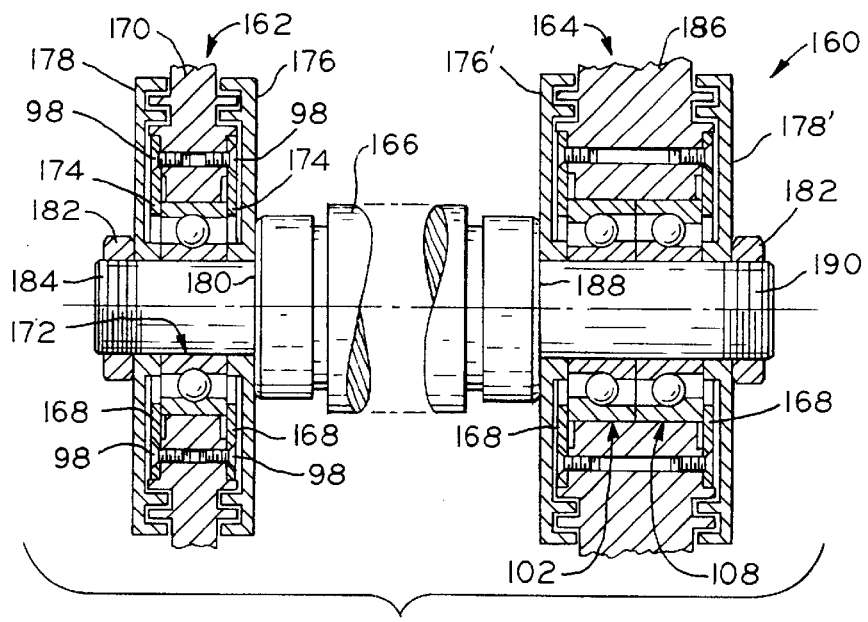
FIG_14
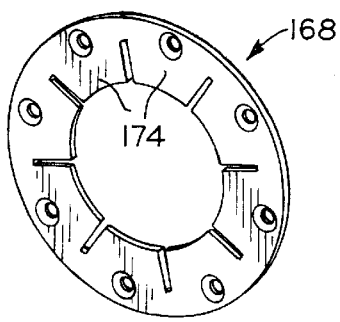
FIG_15
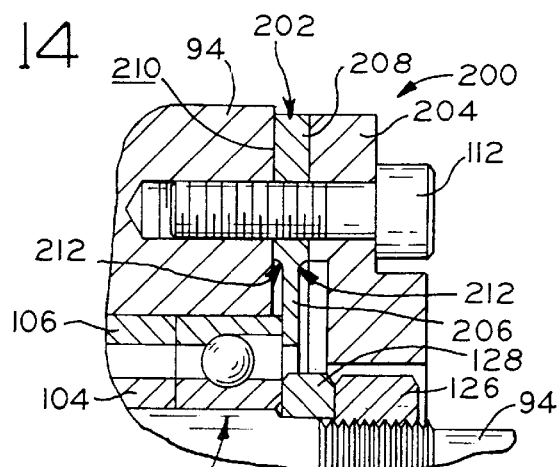
FIG_16
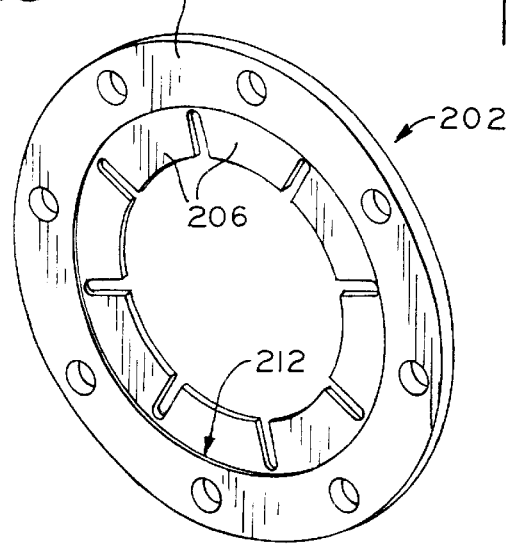
FIG_17

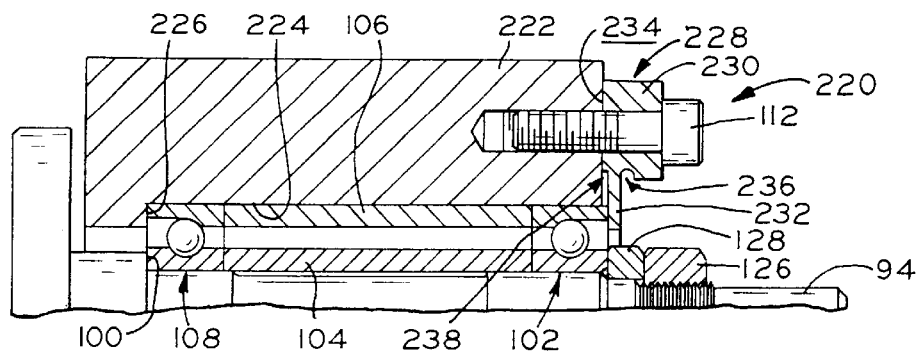
FIG_18
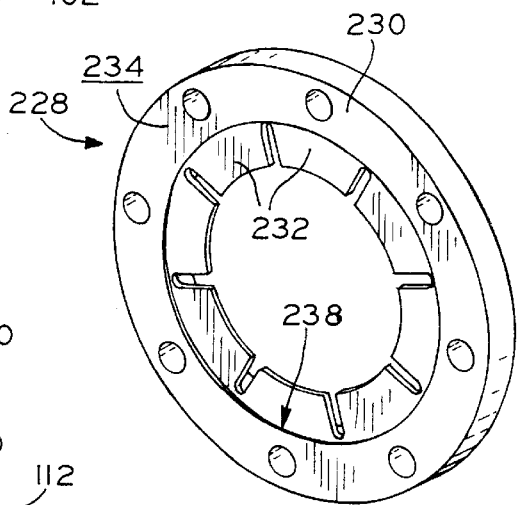
FIG_19
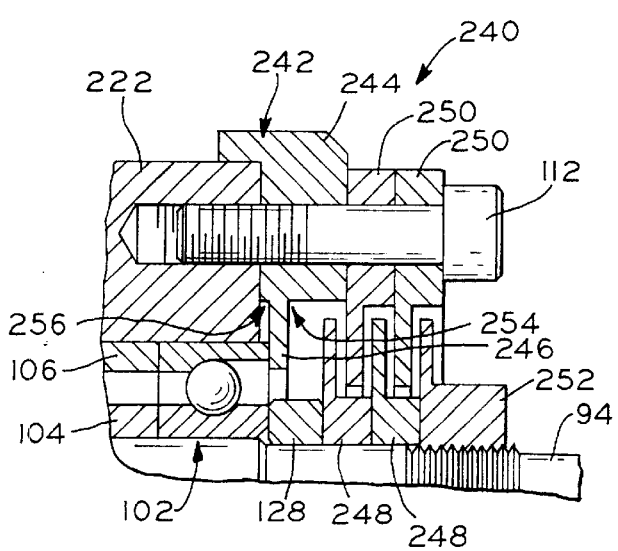
FIG_20
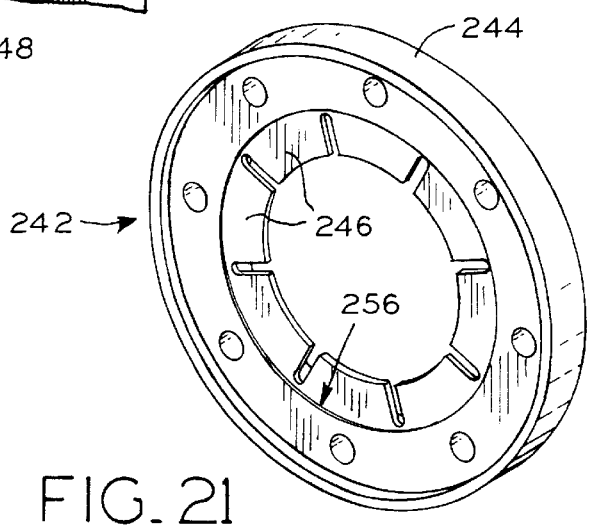
FIG_21

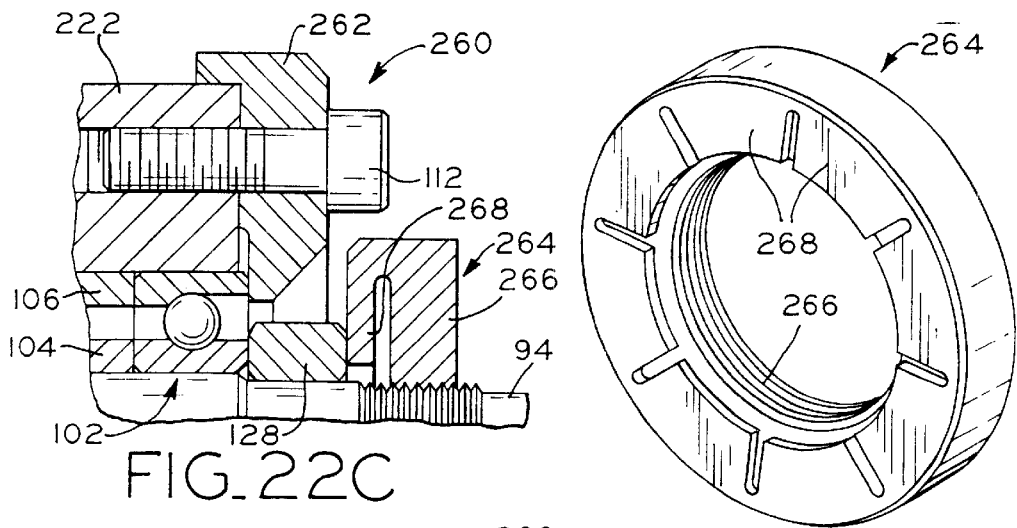
FIG. 22C
FIG. 23
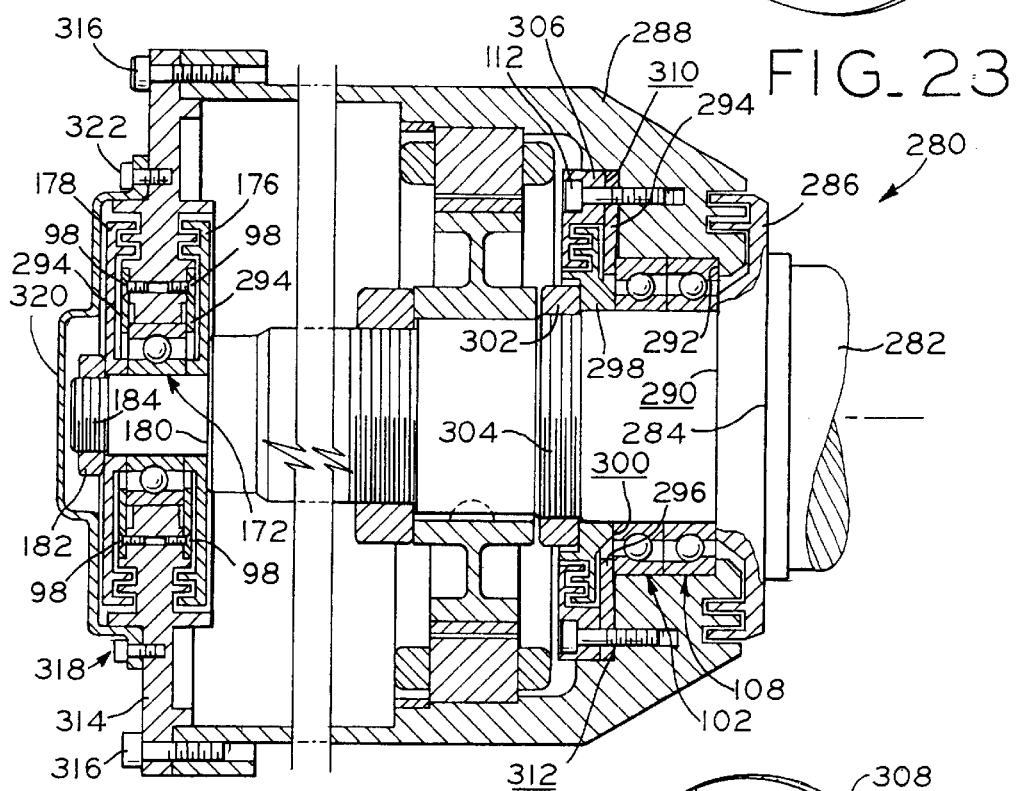
FIG. 24
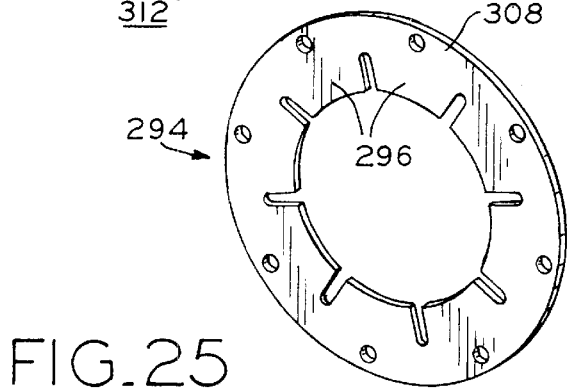
FIG. 25

COMPACT, PRECISION DUPLEX BEARING MOUNT FOR HIGH VIBRATION ENVIRONMENTS

COMPACT, PRECISION DUPLEX BEARING MOUNT FOR HIGH VIBRATION ENVIRONMENTS

The United States Government has a paid-up license in this invention and the right in limited circumstances to require the patent owner to license others on reasonable terms as provided for by the terms of contract No. NAS5-30384 awarded by NASA.

BACKGROUND OF THE INVENTION

The present invention relates to compact duplex bearing mounts, particularly for those bearings which must operate with high precision in high vibration environments.

Duplex bearings are well known in the art and may be generally described as having concentric annular inner and outer races which rotate relative to each other, and an annular arrangement of load-supporting rotating elements, such as balls or rollers, located between the races. High precision applications for duplex bearings are often subjected to vibratory conditions which are severe. For example, duplex bearings must operate with high precision during, and after, the launching of a spacecraft, the vibration caused by an airplane propeller, or the operation of a vehicle on a rough road. The vibration loading on the bearing or its mounts can also adversely affect the bearing running characteristics, resulting in jitter. Further, these loads can also affect the individual components comprising the system supported by the bearing, resulting in deformations that change the modal properties or natural frequencies of the system. These changes in natural frequencies, which are indicative of a change in the loading on the bearing, can result in the generation of objectionable, audible sounds by the bearing-supported system, or vibrations that can adversely affect the life of the bearing, or other systems near the bearing.

For high precision rotation applications, such as those requiring very low rotational jitter (on the order of 10 microseconds of rotational period variation per revolution), the preload force applied to the bearing is critical. Variation in preload may result from yielding of the bearing retaining system and will affect the running torque characteristics of the bearing, which can increase jitter and adversely affect the natural frequencies of the system supported by the bearing.

A previous duplex ball bearing mount for a rotary device is shown in the rotary device depicted in FIG. 1A, which is an electric motor assembly. This mount is very susceptible to variations in the tolerances of the individual parts and tolerances in the preload applied through torquing of the bolts. These variations resulted in variations in jitter and natural frequency as the motor was subjected to vibration and changes in its thermal environment.

Motor assembly 30 includes first and second housing portions 32 and 34, respectively, located on and abutting the opposite axial ends of stator 36. Bolts 37 secure the housing portions and the stator together. Rotor 38 is disposed within stator 36, and has an axis of rotation which is colinear with bore 40 extending through the rotor. Shaft 42 is interference fitted within bore 40, rotatably fixing it to the rotor. End 44 of the shaft extends through first housing portion 32, and is operatively coupled to a device (not shown) driven by the motor. Referring to FIG. 1B, shaft 40 is provided with shoulder 46 between portion 48, which is fitted into the rotor bore, and portion 50, which is supported by duplex bearing 52. Referring again to FIG. 1A, at the end of shaft 40 which is opposite end 44, portion 54 is supported by duplex bearing 56, which is identical to duplex bearing 52. Shoulder 58 is located between shaft portions 48 and 54. Shoulders 46 and 58 respectively abut inner race 60 of bearings 52 and 56, through which shaft portions 50 and 54 extend. Outer race 62 of bearing 56 is received in counterbore 64 of second housing portion 34, and abuts annular face 66 thereof, which forms a bearing retainer.

Outer race 62. of bearing 52 is received in counterbore 68 of first housing portion 32. Disposed between annular face 70 of counterbore 68 and outer race 62 of bearing 52 is wave spring 72, shown in greater detail in FIG. 1C. Spring 72 has free height H1 and variable, loaded height H2. As bolts 37 are tightened, spring 72 is compressed to its loaded height H2 and urges shaft 42 leftward as viewed, through bearing 52 and shoulder 46, and clamps the bearings axially. This bearing mount device is rather sensitive to the amount of torque exerted on bolts 37, therefore bolts 37 must be precisely torqued. The bearing mount device, through deflection of spring 72, preloads the duplex bearing axially, in the direction of the shaft axis of rotation. As the bearing is clamped, spring 72 and, to a lesser extent, the other components of the retaining system, will deflect.

Those skilled in the art will recognize that in the type of duplex ball bearing depicted, an axially directed force is transferred between inner and outer races 60, 62 though interfacing, radially offset shoulders located between the inner and outer races. Balls 74, which roll on these shoulders, support both the axial and radial loads exerted on the bearings. Each race of a bearing may be provided with only one annular shoulder, as shown in FIGS. 1A and 1B. Alternatively, one of the inner or outer bearing races may be formed with a circumferential groove forming a pair of shoulders; during assembly of the bearing, the balls are first disposed in the circumferential groove provided in the inner or outer race, and the other race, having a single shoulder, is then positioned so as to capture the balls between the two races. Notably, each duplex bearing must be oriented and assembled into its mount such that axial forces exerted on one of its inner and outer races will be directed through its shoulder and the balls, to the shoulder of the other bearing race; otherwise the bearing may come apart.

As the bearing is clamped, spring 72 will deflect, applying a load to outer race 62 of bearing 52 that is proportional to the deflection. Thus, changes in the deflection of the spring will result in changes in the load on the bearing. FIG. 2 shows the substantially linear relationship between spring deflection and bearing load. The clamping torque, which can be measured as the torque to rotate the inner bearing races relative to their associated outer bearing races, is shown on the abscissa of FIG. 2 and is analogous to the deflection of the spring. Thus, increased torque results in an increased load on the bearing.

The Smalley Steel Ring Company produces wave springs of the type used in motor assembly 30; disc springs and finger disc springs may also used. These spring designs, however, have a load variation on the order of +/−25%. This is not acceptable for high precision mechanisms, which require stable performance, especially over a long period of time under severe environment conditions, as required of space flight mechanisms such as, for example, an Advanced Very High Resolution Radiometer (AVHRR) (not shown), the primary imaging instrument on certain polar orbiting meteorological satellites. In such applications, an open loop scanner is positioned by a motor having a shaft supported by duplex bearings.

FIGS. 4–7 show a number of other previous spring-based concepts by which various configurations of shaft 42' is supported by a plurality of duplex ball bearings 52, 52', 56, and/or 56'. Each of these concepts employ coil springs 76, which are more linear in their force versus deflection characteristics vis-a-vis wave spring or disc springs. Coil springs, however, require much more axial space. If coil springs 76 were eliminated from the designs of FIGS. 3–7, however, it would be impossible to clamp the bearings without changing the effective preload. Further, if coil springs 76 were not present, the load applied when inner and outer bearing retainers 78, 80 are clamped would result in deflection of other parts of the system, such as bearing races 60, 62, any bearing spacers 82, or the bearing retainers themselves.

Notably, too, if the resulting stress from the applied clamping load were greater in outer race 62 than in inner race 60, or vice versa, the resulting strain would cause a change in the effective preload of the bearing, which is undesirable.

Although previous bearing mounts employing springs 72, 76 are used to provide a defined point of deflection in a bearing mount, they are not effective for high-precision applications which are required to undergo severe vibrations, which impart high loads to the bearings. For example, during vibration, the bearings of the above-mentioned AVHRR scanner experiences loads approaching 1000 pounds, well beyond the load capacity of existing wave, disk and coil springs given the small amount of axial space available.

Further, unless painstaking measures are taken to control tolerance stackup in the rotary device assembly, previous bearing mounts are largely susceptible to variations in bearing loads. Moreover, unless materials of common coefficient of thermal expansion are used for those parts which comprise the bearing mount system, changes in bearing preload can occur in cases where previous bearing mounts are subjected to changes in their thermal environments.

A high precision duplex bearing mount which overcomes the above-mentioned variability problems, requires less packaging space than previous mounts, is substantially impervious to changes in temperature and tolerance stackup in the rotary device assembly, and is suitable for use in high-vibration environments is highly desirable. Such a bearing mount would be particularly useful wherever high precision bearings are desired, such as, for example, in machine tool and semiconductor manufacturing machinery applications, as well as in aerospace applications.

SUMMARY OF THE INVENTION

The present invention applies a precise, controlled clamping load on duplex bearings while providing a mount which can survive high vibration loads. The sensitivity to the torque applied in axially clamping the bearing is also eliminated, providing a more robust bearing mount design vis-a-vis previous bearing mounts. The inventive duplex bearing mount also provides a very compact package requiring little space, and is lightweight, making it particularly useful for use in spacecraft and other applications where required package space and weight must be minimized.

The present invention provides a duplex bearing mount including at least one duplex bearing having an inner race and an outer race, the inner race disposed within the outer race and being rotatable relative to the outer race about an axis, the inner race having substantially no relative movement relative to the outer race in at least one direction along the axis, the inner and outer races each having first and second axial faces which are respectively located at the same axial end of the duplex bearing. The duplex bearing is radially supported by a housing, and a shaft extends through the inner race, the shaft radially and axially supported by the inner race. A first retainer is connected to the housing and engages the first axial surface of a bearing race, the movement of which race in a first direction along the axis being constrained by the first retainer. A second, resilient retainer is connected to the housing or the shaft and is deflected through engagement with the second axial face of a bearing race, the movement of which race in a second direction along the axis, opposite to the first direction, being constrained by the deflected second retainer. The bearing is preloaded by its being clamped between the first and second retainers, and the second retainer forms at least a portion of a spring having the characteristic of a substantially constant force value correlating to a range of various deflection values, whereby the preload of the bearing is substantially unaffected by variations in the deflection of the second retainer.

The present invention also provides a duplex bearing mount including first and second duplex bearings each having an annular inner race and an annular outer race, the inner races respectively disposed within the outer races and being rotatable relative to the outer races about an axis. Relative movement between the inner and outer races of each respective bearing in at least one direction along the axis is constrained, radial movement of each bearing relative to the axis is constrained, and the first and second bearings have fixed relative positions along the axis. A bearing retainer is in operative engagement with the first bearing outer race, movement of the first bearing along the axis in the direction of the retainer being limited by the bearing retainer. An annular member is connected to the bearing retainer and includes a plurality of radially inwardly extending resilient tabs which engage the second bearing outer race and are deflected thereby, the first and second bearings being urged in a direction along the axis toward the bearing retainer. The annular member at least partially defining a nonlinear spring having the characteristic of a substantially constant force value corresponding to a range of different deflection values, whereby a constant preload can be exerted on the duplex bearings under varying amounts of tab deflection.

The present invention also provides a duplex bearing mount for a rotary device, including a pair of duplex bearings each having an inner race and an outer race, the inner race disposed within the outer race and being rotatable relative thereto about an axis, the inner races and the outer races respectively engaged with each other along the axis. A bearing retainer is engaged with the outer race of one of the duplex bearings, movement of the duplex bearings in one direction along the axis being limited by the bearing retainer. Also included are means for providing a substantially constant preload on the duplex bearings under varying amounts of displacement of the duplex bearings in directions along the axis.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1A is a longitudinal sectional view of a motor assembly having one embodiment of a previous duplex bearing mount;

FIG. 1B is an enlarged view showing the encircled portion of FIG. 1A;

FIG. 1C is a side view of a portion of the wave spring shown in FIG. 1A;

FIG. 2 is a graph illustrating the relationship between bearing load and clamping torque in the bearing mount of the motor shown in FIG. 1A;

FIGS. 3–7 are sectional views of various previous duplex bearing mounts having coil springs for axially clamping the bearings;

FIG. 8A is a fragmentary, partially sectioned view of a rotary device employing a first embodiment of a duplex bearing mount according to the present invention;

FIG. 8B is an enlarged view showing the corresponding encircled portion of FIG. 8A;

FIG. 8C is an enlarged view showing the corresponding encircled portion of FIG. 8A;

FIG. 9A is an oblique view of a first embodiment of a spring for a duplex bearing mount according to the present invention;

FIG. 9B is a plan view of the spring of FIG. 9A;

FIG. 9C is a view of the spring of FIG. 9B along line 9C—9C;

FIG. 9D is a view of the spring of FIG. 9B along line 9D—9D;

FIG. 10 is a graph illustrating the relationship between bearing load and clamping torque in the inventive bearing mount of the rotary device of FIG. 8A;

FIG. 11 is a fragmentary, sectional, partially exploded view of the rotary device of FIG. 8A;

FIG. 13A is a fragmentary, partially sectioned view of a rotary device employing a second embodiment of a duplex bearing mount according to the present invention;

FIG. 13B is an exploded view of a portion of the device shown in FIG. 13A;

FIG. 14 is a fragmentary, partially sectioned view of a rotary device employing a third embodiment of a duplex bearing mount according to the present invention;

FIG. 15 is an oblique view of a second embodiment of a spring for a duplex bearing mount according to the present invention;

FIG. 16 is a fragmentary, partially sectioned view of a rotary device employing a fourth embodiment of a duplex bearing mount according to the present invention;

FIG. 17 is an oblique view of a third embodiment of a spring for a duplex bearing mount according to the present invention;

FIG. 18 is a fragmentary, partially sectioned view of a rotary device employing a fifth embodiment of a duplex bearing mount according to the present invention;

FIG. 19 is an oblique view of a fourth embodiment of a spring for a duplex bearing mount according to the present invention;

FIG. 20 is a fragmentary, partially sectioned view of a rotary device employing a sixth embodiment of a duplex bearing mount according to the present invention;

FIG. 21 is an oblique view of a fifth embodiment of a spring for a duplex bearing mount according to the present invention;

FIG. 22C is an enlarged view of a second portion of FIG. 22A;

FIG. 23 is an oblique view of a sixth embodiment of a spring for a duplex bearing mount according to the present invention;

FIG. 24 is a longitudinal sectional view of a rotary device employing an eighth embodiment of a duplex bearing mount according to the present invention; and FIG. 25 is an oblique view of a seventh embodiment of a spring for a duplex bearing mount according to the present invention.

Figure 12A:
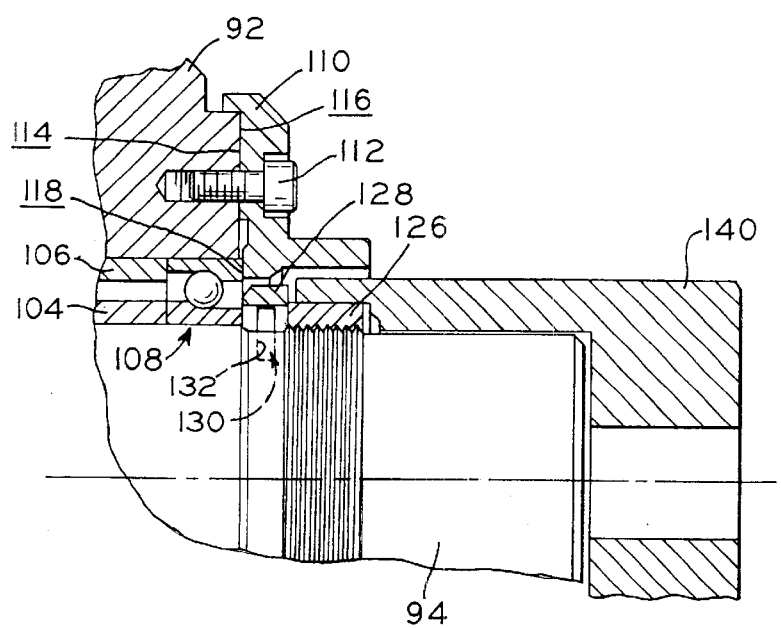
FIG. 12A is an assembled view of the rotary device of FIG. 11, also showing a bearing clamp nut torque tool.

Corresponding reference characters indicate corresponding parts throughout the several views. The exemplifications set out herein illustrate different embodiments of the present invention, in several forms, and such exemplifications are not to be construed as limiting the scope of the invention in any manner.

DETAILED DESCRIPTION OF THE INVENTION

Referring to FIG. 8A, there is shown a rotary device, such as, for example, a motor assembly, which employs a first embodiment of a duplex bearing mount according to the present invention. Rotary device 90 includes housing 92 within which shaft 94 is rotatably supported. Annular cantilever spring member 96 is attached to housing 92 by a plurality of circumferentially distributed screws 98. Compared to the alternatives such as wave washers and disc springs, spring 96 is just as compact while having a greater load capacity and a higher spring rate. Both of these features make this design capable of surviving high vibration loads, which would be well beyond the capability of the wave spring or disc springs.

Shaft 94 is provided with annular shoulder 100 against which one axial surface of the inner race of duplex ball bearing 102 abuts. One axial surface of the outer race of bearing 102 abuts spring 96, as described further hereinbelow. A plurality of balls are disposed between the inner and outer races of bearing 102, in the manner described above with respect to previously known duplex bearings. The other axial surfaces of the inner and outer races of bearing 102 respectively abut an axial end of cylindrical spacers 104 and 106. The opposite axial ends of spacers 104 and 106 respectively abut the inner and outer races of duplex ball bearing 108, which is substantially identical to bearing 102. Bearings 102 and 108, and their orientation in rotary device 90, are known as being of a "DB" configuration.

At the right side of rotary device 90, as viewed in FIG. 8A, rigid annular bearing retainer 110, which may be made of the same material as housing 92, is attached to housing 92 by means of a plurality of circumferentially distributed bolts or cap screws 112. Referring to FIG. 8B, bearing retainer 110 applies an axially-directed load to the abutting axial surface of the outer race of bearing 108 as bolts 112 are tightened until its surface 114 abuts that of housing surface 116. With reference to FIG. 11, surface 118 of bearing retainer 110, which abuts the adjacent axial surface of the outer race of bearing 108, is match-machined relative to pre-assembly stickout dimension S of the specific bearings 102, 108, housing 92 and cylindrical spacer 106 used. This match-machining, which distances retainer surface 118 from retainer surface 114 by dimension Y, is designed to provide a specific deflection X in spring 96 of, for example, 0.002 inch, which provides the desired preload force on bearings 102, 108. Once this deflection has been achieved, bearing retainer 110 seats against housing 92, and no further load is imparted to bearings 102, 108. Referring to FIG. 8C, it can be seen that, when retainer 110 is fully seated, a portion of spring 96 is deflected axially away from housing surface 119, the abutting end of the outer race of bearing 102 now sticks out 0.002 inch beyond surface 119.

Referring to FIGS. 9A–D, annular spring 96 is provided with eight (8) radially inwardly extending tabs 120, equally distributed about its inner circumference. Tabs 120 abut the outer race of bearing 102 (FIG. 8A) and retain the bearing within housing 92. Thus, it is to be understood that spring member 96 and all of the other annular springs described hereinbelow are resilient bearing retainers. The tabs of spring 96, and the other annular springs described hereinbelow, additionally provide bearing mounts according to the present invention with a structure which allows the bearings to self-align within the mount. Tabs 120 each support a section of the bearing, and will independently adjust to provide the correct support. This feature of the present invention beneficially provides repeatability of assembly.

Interposed between adjacent tabs 120 are eight (8) countersunk holes 122 through which screws 98 extend. Spring 96, like all other embodiments of annular springs described hereinbelow, is made of a martensitic stainless steel such as, for example, heat treated Custom 455 H1000 available from Carpenter Steel. Spring 96 is planar and has thickness t (FIG. 9C) of approximately 0.080 inch. Width b (FIG. 9B) of the root of each tab 120 is approximately 0.216 inch, and each tab has length L of approximately 0.210 inch. The dimensions and structure of spring 96, or those described hereinbelow, my be tailored to provided the desired force/deflection characteristics. Because the cross section of each tab 120 of spring 96 is rectangular, its moment of inertia I is defined as $bt^3/12$ ($in^1$).

The linear spring rate constant of a cantilever spring is defined as $k=3EI/L^3$ (lb/in), where E is the modulus of elasticity E, and I is the moment of inertia; those skilled in the art will recognized that spring 96 may be considered to include eight (8) such springs.

An illustrative capability comparison between an embodiment of a bearing mount according to the present invention, and previous bearing mounts utilizing a wave spring or a disc spring in a similar rotary device, using a 1 inch OD bearing, is provided in Table 1.

TABLE 1

Comparison of Spring Capabilities

| Property | Inventive Bearing Mount | Previous (Wave Spring) | Previous (Disc Spring) |
| --- | --- | --- | --- |
| Working Load | 400 lbs | 15 lbs | 23 lbs |
| Working Height | 0.075 inches | 0.06 inches | 0.02 inches |
| Spring Rate | 400,000 lbs/inch | 633 lbs/in | 1026 lbs/in |

Notably, the usual linear force/displacement relationship for a spring, depicted in FIG. 2, does not hold for the inventive bearing mount design. Spring 96 is held against surface 119 of housing 92 by screws 98. As bolts 112 are tightened, however, and surface 114 of bearing retainer 110 approaches interfacing surface 116 of housing 92, bearing 108, spacer 106 and bearing 102 are displaced to the left, as described above, deflecting tabs 120 (FIG. 120). At a critical point in this displacement, a portion of the abutting surface 121 of spring 96 separates from housing surface 119, creating a gap region in which there is no direct abutting contact between a portion of spring surface 121 and housing surface 119. Referring to FIG. 8C, this gap is shown at 125. Gap 125 is very small but is significant in that it changes the spring rate of spring 96 by effectively lengthening the moment arms of tabs 120 with further deflection. The lengthened moment arm corresponds to length L in the cantilever spring constant equation $k=3EI/L^3$ (lb/in). Thus, it will be understood that, past the critical point at which surfaces 119 and 121 locally separate, as surface 114 of retainer 110 approaches surface 116 of housing 92, length L effectively increases in equation $k=3EI/L^3$ (lb/in) and, k decreases with increasing deflection of spring 96.

The force/deflection curve for spring 96 as installed in rotary device 90 is shown in FIG. 10, and illustrates that spring 96 assumes a nonlinear force/deflection characteristic after its initial deflection; past the critical point of its deflection, spring 96 becomes a spring having the characteristic of a range of substantially constant force value correlating to a range of various deflection values. Once the plateau of the curve in FIG. 10 is reached, the preload of bearings 102, 108 is substantially unaffected by further increases in the deflection of spring 96. It is to be noted that bearing retainer clamping torque, which can be measured as the torque on bolts 112, is proportionally analogous to the deflection which spring 96 undergoes. Thus, FIGS. 2 and 10 may be directly compared.

Rather than bearing load increasing in direct proportion with spring deflection, the load level substantially plateaus after the above-mentioned critical point, at which gap 125 is formed and the moment arms of tabs 120 lengthen. Up to the critical point, the overall spring rate for spring 96 is approximately 247,000 lb/in; for further deflection beyond the critical point, the load remains substantially constant.

Notably, this critical point is reached before surface 114 of bearing retainer 110 has been abuttingly seated on interfacing surface 116 of housing 92; thus once bearing retainer 110 has been fully assembled and secured, the bearing load is stabilized to a maximum level. With reference again to FIG. 10, point $P_0$ represents the point at which the bearing retainer clamping torque (on bolts 112), and thus the deflection, at which the desired preload is reached. In the present example, this deflection is 0.0002 inch, and corresponding point $P_0$ is well on the curve's plateau. Points $P_{+20\%}$ and $P_{-20\%}$ represent points at which the deflection is respectively increased or decreased by 20% from point $P_0$. These deflection variations may occur from, for example, variations in temperature, which cause various components of the bearing mount to shrink or expand at different rates, and/or vibrational loading of the system. Despite these substantial variations in spring deflection, the load on the bearing remains unchanged. Indeed, spring deflection variations on the order of 40% effect no appreciable variation from the bearing preload, as indicated by reference to points $P_{+40\%}$ and $P_{-40\%}$. Those skilled in the art will appreciate that the inventive bearing mount system will thus provide a stable bearing preload which is substantially insensitive to vibration and/or changes in thermal environment, as well as tolerance stackup in the assembly of the rotary device. Notably, the present invention beneficially provides the ability to use components having various coefficients of thermal expansion; relative expansions of the bearing mount system components will not affect the preload on the bearing once that preload level is established well upon the plateau of the curve shown in FIG. 10.

The high spring rate of spring 96, in conjunction with the solid mounting of rigid bearing retainer 110 allows device 90 to survive high levels of vibration without changes in position of its components. As a result, rotary devices employing the inventive bearing mount are able to achieve perfect device performance.

As noted above, for the bearing preload to be desirably unaffected by the clamping process, the strain on the inner races of bearings 102 and 108 must be equal to the strain on the outer races of these bearings. To equalize these strains, the inner races of bearings 102, 108 are clamped through means of nut 126 threadedly engaged to shaft 94. Referring to FIG. 11, shaft 94 is provided with threaded portion 124, upon which is threadedly engaged nut 126. Disposed between and abutting nut 126 and the inner race of bearing 108 is annular spacer 128. Spacer 128 is rotatably fixed to shaft 94 by means of pin 130 which is fitted into radially extending bore 132 in shaft 94, and projects radially from the cylindrical surface of the shaft between bearing 108 and shaft threaded portion 124. The projecting portion of pin 130 is received in axial slot 134 located in the inner circumferential surface of spacer 128. Mating annular surfaces 136 and 138 of nut 126 and spacer 128, respectively, are extremely flat and perpendicular to the axis of rotation of shaft 94.

Figure 12B:
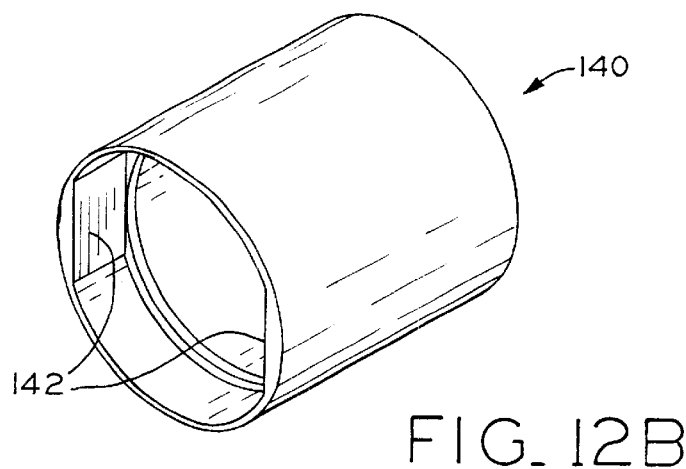
FIG. 12B is an oblique view of the nut torque tool of FIG. 12A.

Referring to FIG. 12A, socket tool 140, which may be fitted onto a socket drive torque wrench (not shown), engages radially opposite flats (not shown) provided on nut 126. Corresponding flats 142 of tool 140 are shown in FIG. 12B. Nut 126 is torqued to an appropriate level to bring the strain in the inner races of bearings 102 and 108, which are in contact with each other through spacer 104, into equivalence with the strain in the outer races of these bearings resulting from the above-described preloading. A test may be run to verify that the proper torque has been applied, which uses a bearing spacer 104 instrumented with strain gages to determine the torque that needs to be applied to spacer 104 to match the stress, and resulting strain, in spacer 104 with that in outer spacer 106. In the final assembly, nut 126 is torqued to the correct value using tool 140.

An illustrative comparison of modal characteristics, before and after vibration, between an embodiment of a bearing mount according to the present invention, and a previous bearing mount utilizing a wave spring in a similar rotary device, is provided in Table 2. The tests performed show little change in natural frequencies of the rotary device, exemplified by a motor, with the inventive bearing mount, and running torque data taken on the motor indicated a consistent bearing preload.

TABLE 2

Comparison of Modal Data New Design versus Old Design

| | Inventive Bearing Mount | Previous Bearing Mount |
|---|---|---|
| First Mode prior to Vibration (Hz) | 270 | 290 |
| First Mode after Vibration (Hz) | 270 | 240–220 |
| Delta (Hz) | 0 | 50–70 |

Measurement error of modes is estimated to be 5 Hz.
"Previous" numbers in Table 2 are approximate and based on a large number of samples.

Referring now to FIG. 13A and 13B, there is shown a rotary device including a second embodiment of a bearing mount according to the present invention. Rotary device 150, which may be part of a scanner for an AVHRR (discussed above). Rotary device 150 is substantially identical to rotary device 90 except that bearings 102 and 108 are interchanged; their orientation in rotary device 150 is of a "DF" configuration. In the DF configuration, nut 126 merely holds the bearings on shaft 94. Spring 96 limits the applied preload to the proper amount in the manner described above.

Referring now to FIG. 14, there is shown rotary device 160 which includes a third embodiment of a bearing mount according to the present invention. Rotary device 160 includes two separate bearing mounts 162, 164, one for each end of shaft 166. Each bearing mount includes a pair of spring members 168. As shown in FIG. 15, spring 168 is similar to spring 96 (FIG. 9A), but its dimensions and structure may be tailored to provided the desired force/deflection characteristics. The bearing mount of rotary device 160 may be directly compared with the previous bearing mount shown in FIG. 6 and, as can be readily seen, is comparatively much more compact.

Single bearing mount 162 includes stationary housing member 170 to which springs 168 are attached by screws 98. The outer race of duplex ball bearing 172 is captured between tabs 174 of springs 168, which provide a controlled load on the bearing. The inner race of bearing 172 is abutted, on its opposite axial sides, by rotating members 176 and 178. Rotating member 176 abuts shoulder 180 of shaft 166; rotating member 178 serves as a clamping spacer and is engaged by nut 182 which is threadedly engaged with threaded portion 184 of shaft 166. The interfacing surfaces of housing member 170 and rotating members 176, 178 cooperatively form a labyrinth seal. An added feature of the spring member on the single bearing is that it limits the load on the bearing while allowing, axial defection of the shaft due to thermal expansion. This prevents the bearing from becoming overloaded during periods of temperature variation.

Double bearing mount 164 is of the DB configuration, but does not include spacers such as 104, 106 employed in the first and second inventive bearing mount embodiments. Rather, bearings 102 and 108 directly abut each other. Springs 168 are attached to stationary housing member 186, and engage the outer races of bearings 108, 102, providing a controlled preload thereto. Rotating member 176' abuts shoulder 188 of shaft 166; rotating member 178' serves as a clamping spacer and is engaged by nut 182 which is threadedly engaged with threaded portion 190 of shaft 166. The interfacing surfaces of housing member 186 and rotating members 176', 178' cooperatively form a labyrinth seal.

Notably, previous bearing mounts, such as that shown in rotary device 30 (FIG. 1A) cannot be precisely adjusted; as a result these types of bearing mounts cannot be used in combination with low friction labyrinth seals.

Referring now to FIG. 16, there is shown rotary device 200 which, like rotary device 150 (FIG. 13A) employs a DF bearing configuration. Device 200 includes a fourth embodiment of a bearing mount which includes, at both ends of shaft 94, spring 202 and spring keeper 204. Spring 202 is shown in FIG. 17 and like springs 96 and 168, includes tabs which project radially inward to engage the outer bearing race. Tabs 206 are integrally formed with annular portion 208 which is of greater thickness than tabs 206. Annular face 210 of spring 202 is match-machined to provide the desired amount of tab deflection once spring keeper 204 is fully seated, and annular portion 208 is tightly sandwiched between the opposed surfaces of housing 94 and spring keeper 204. As in the above-described DF bearing configuration, nut 126 merely holds the bearings onto the shaft. The structure of the junction of tabs 206 and annular portion 208 may be tailored to impart a spring characteristic which is nonlinear, as shown in FIG. 10; for example, radii of curvature 212 and 214 may be specifically designed to provide a plateau on the force deflection curve for spring 202 upon which variations in deflection do not correlate to a substantial change in bearing load.

Referring now to FIG. 18, there is shown rotary device 220 having housing 222 having counterbore 224 which forms shoulder 226 against which the outer race of bearing 108 abuts. Shoulder 226 thus forms a bearing retainer. Here again, bearings 102 and 108 have a DF configuration. Spring member 228 has integrally formed spring keeper portion 230, attached to housing 222 by bolts 112, and radially inwardly directed tabs 232 which engage the outer race of bearing 102. Surface 234 of spring keeper portion 230 is match-machined as described above to provide the desired amount of spring deflection once device 220 is fully assembled. The structure of the junction of tabs 232 and keeper portion 230 may be tailored to impart a spring characteristic which is nonlinear, as shown in FIG. 10; for example, radii of curvature 236 and 238 may be specifically designed to provide a plateau on the force deflection curve for spring 228 upon which variations in deflection do not correlate to a substantial change in bearing load. As in the above-described DF bearing configurations, nut 126 merely holds the bearings onto the shaft.

Referring now to FIG. 20, there is shown rotary device 240 also having housing 222, but in which spring member 242, which has integral spring keeper portion 244 and tabs 246, is combined with inner and outer labyrinth seal members 248, 250, respectively. Device 240 includes a sixth embodiment of a bearing mount according to the present invention. Spring 242 is also shown in FIG. 21. Inner labyrinth seal members 248 rotate with shaft 94, and serve as spacers which bear on spacer 128. Nut 252, threadedly engaged. onto the threaded portion of shaft 94, also forms part of the labyrinth seal. Notably, the clamping of outer seal members 250 affects the preload applied to the bearings. Spring keeper portion 244 is match-machined, as described above, to effect the proper amount of tab deflection and appropriately preload the bearings. The structure of the junction of tabs 246 and keeper portion 244 may be tailored to impart a spring characteristic which is nonlinear, as shown in FIG. 10; for example, radii of curvature 254 and 256 may be specifically designed to provide a plateau on the force deflection curve for spring 242 upon which variations in deflection do not correlate to a substantial change in bearing load. In this embodiment, nut 252, in conjunction with inner seal members 248, holds the bearings onto the shaft; this is a DF configuration.

Figure 22A:
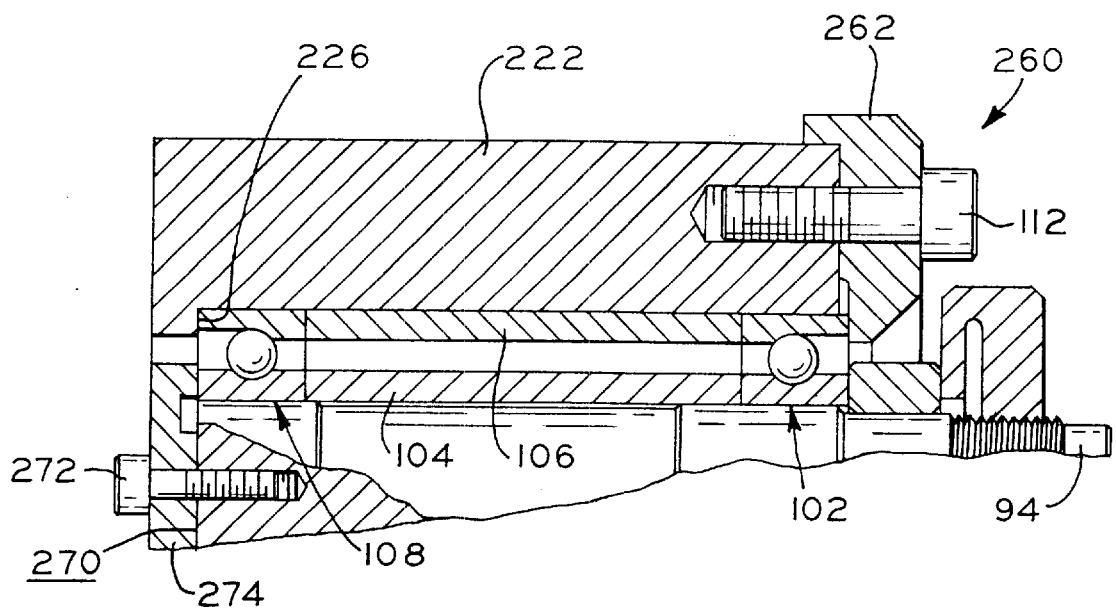
FIG. 22A is a fragmentary, partially sectioned view of a rotary device employing a seventh embodiment of a duplex bearing mount according to the present invention.
Figure 22B:
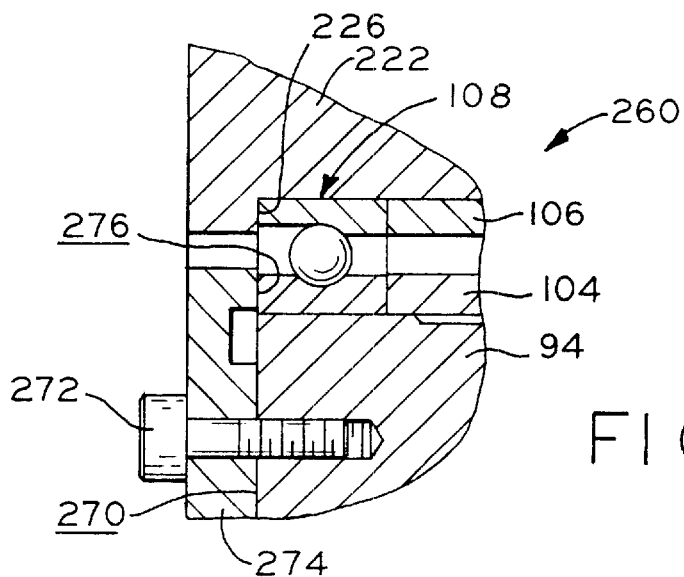
FIG. 22B is an enlarged view of a first portion of FIG. 22A.

Referring now to FIG. 22A, there is shown rotary device 260, which includes a seventh embodiment of a bearing mount according to the present invention. As shown in FIGS. 22A and 22B, device 260 includes housing 222 having annular shoulder 226, and bearing retainer 262, which is match-machined to provide a compressive load on the outer races of bearings 102 and 108, and on spacer 106. In this embodiment, a terminal end of shaft 94 is provided with surface 270 which is flat and perpendicular to the shaft axis of rotation. Mounted to surface 270, via bolts 272, is inner bearing retainer 274. Surface 276 of inner bearing retainer 274 abuts the inner race of bearing 108. Referring to FIG. 22A and 22C, unlike the annular springs of the above-discussed embodiments of the present invention, in this embodiment spring 264 includes nut portion 266, which is threadedly engaged onto the threaded portion of shaft 94, and tab portions 268 which extend radially inwardly from the outer circumference of nut portion 266 and bear on spacer 128, which abuts the inner race of bearing 102. Rotary device 260 thus includes a bearing mount in which the spring applies a preload to the inner bearing races, rather than to the outer bearing races.

Referring now to FIG. 24, there is shown rotary device 280 which includes an eighth embodiment of a bearing mount according to the present invention. Device 280 includes shaft 282 having shoulder 284 against which abuts rotating member 286. The interfacing surfaces of member 286 and housing portion 288 cooperate to form a labyrinth seal. Member 286 has annular surface 290 against which the inner race of bearing 108 abuts. The outer race of bearing 108 abuts shoulder 292 formed in housing portion 288. Shoulder 292 thus forms a bearing retainer. Bearings 108 and 102 directly abut each other, as shown. Annular spring member 294, also shown in FIG. 25, has tabs which engage the outer race of bearing 102. Rotating member 298 has annular surface 300 which engages the inner race of bearing 102. Rotating member 298 is engaged by nut 302 threadedly engaged onto threaded portion 304 of shaft 282.

Spring keeper 306 engages outer peripheral portion 308 of spring 294 and clamps same between spring keeper surface 310 and surface 312 of housing portion 288. Bolts 112 extend through holes provided in spring keeper 306 and spring 294, and secure them to housing portion 288. The interfacing surfaces of member 298 and spring keeper 306 cooperate to form a labyrinth seal. Shoulder 292 is match-machined relative to bearings, 102, 108 to provide the desired amount of bearing 102 stickout; when bolts 112 are tightened, the proper amount of bearing preload is thus provided. Strains in the inner and outer races of the bearings are equalized through appropriate torquing of nut 302, which acts on the inner bearing races through member 298.

Referring to the left side of device 280 as viewed in FIG. 24, it can be seen that the terminal end of shaft 282 is supported through a bearing mount which includes housing portion 314 attached to housing portion 288 via bolts 316. Other than as shown in FIG. 24, the structure of bearing mount 318 is very similar to that of bearing mount 162 shown in FIG. 14; they share several commonly identified elements. Cover 320 is attached to housing portion 314 via bolts 322 to enclose bearing mount 318.

Spring 294 is similar to springs 96 (FIG. 9A) and 168 (FIG. 15), but its dimensions and structure may be tailored to provided the desired force/deflection characteristics.

While this invention has been described as having a various designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A duplex bearing mount comprising:
   at least one duplex bearing having an inner race and an outer race, said inner race disposed within said outer race and being rotatable relative to said outer race about an axis, said inner race having substantially no relative movement relative to said outer race in at least one direction along said axis, said inner and outer races each having first and second axial faces which are respectively located at the same axial end of said duplex bearing;

a housing, said duplex bearing radially supported by said housing;

a shaft which extends through said inner race, said shaft radially and axially supported by said inner race;

a first retainer connected to said housing and being engaged with the first axial surface of a bearing race, the movement of which race in a first direction along said axis being constrained by said first retainer;

a second, resilient retainer connected to one of said housing and said shaft and being deflected through engagement with the second axial face of a bearing race, the movement of which race in a second direction along said axis, opposite to said first direction, being constrained by said deflected second retainer;

wherein said bearing is preloaded by its being clamped between said first and second retainers, and said second retainer forms at least a portion of a spring having the characteristic of a substantially constant force value correlating to a range of various deflection values, whereby the preload of said bearing is substantially unaffected by variations in the deflection of said second retainer.

2. The duplex bearing mount of claim 1, wherein said duplex bearing is a first duplex bearing, and further comprising a second duplex bearing, said first retainer being engaged with a race of said first duplex bearing, said second retainer being engaged with a race of said second duplex bearing.

3. The duplex bearing mount of claim 2, wherein the outer races of said first and second duplex bearings are engaged with each other, and the inner races of said first and second duplex bearings are engaged with each other.

4. The duplex bearing mount of claim 3, further comprising an inner spacer disposed between the inner races of said first and second duplex bearings, and an outer spacer disposed between the outer races of said first and second duplex bearings, said inner races, and said outer races, respectively being engaged through said inner and outer spacers.

5. The duplex bearing mount of claim 2, wherein said first retainer is engaged with the outer race of said first duplex bearing.

6. The duplex bearing mount of claim 5, wherein said first retainer is annular.

7. The duplex bearing mount of claim 5, wherein said first retainer is attached to said housing.

8. The duplex bearing mount of claim 5, wherein said first retainer is integral with said housing.

9. The duplex bearing mount of claim 2, wherein said second retainer is engaged with the outer race of said second duplex bearing and is attached to said housing.

10. The duplex bearing mount of claim 9, wherein said second retainer is annular and includes a plurality of radially inwardly extending tabs, said tabs being engaged with the outer race of said second duplex bearing.

11. The duplex bearing mount of claim 9, wherein a gap is formed between interfacing surfaces of said second retainer and said housing.

12. The duplex bearing mount of claim 1, wherein said first and second retainers are both resilient.

13. The duplex bearing mount of claim 1, wherein said second retainer is annular and includes a plurality of radially inwardly extending tabs, said tabs being engaged with a race, each said tab forming a cantilever spring.

14. The duplex bearing mount of claim 13, wherein said second retainer is connected to said housing, and said tabs are engaged with said outer race.

15. The duplex bearing mount of claim 14, wherein said duplex bearing is a first duplex bearing and further comprising a second duplex bearing, said first and second duplex bearings being engaged with each other, said first retainer being engaged with the outer race of said first duplex bearing, said second retainer being engaged with the outer race of said second duplex bearing.

16. The duplex bearing mount of claim 15, further comprising a nut secured to said shaft, said nut being engaged with the inner race of said second duplex bearing.

17. The duplex bearing mount of claim 16, further comprising a shaft spacer disposed between the inner race of said second duplex bearing and said nut, said nut being engaged with the inner race of said second duplex bearing through said shaft spacer.

18. The duplex bearing mount of claim 17, wherein said shaft and said shaft spacer have no relative rotation about said axis.

19. A duplex bearing mount, comprising:

first and second duplex bearings each having an annular inner race and an annular outer race, said inner races respectively disposed within said outer races and being rotatable relative to said outer races about an axis, relative movement between said inner and outer races of each respective bearing in at least one direction along said axis being constrained, radial movement of each said bearing relative to said axis being constrained, said first and second bearings having fixed relative positions along said axis;

a bearing retainer in operative engagement with said first bearing outer race, movement of said first bearing along said axis in the direction of said retainer being limited by said bearing retainer;

an annular member connected to said bearing retainer and comprising a plurality of radially inwardly extending resilient tabs, said tabs engaging said second bearing outer race and being deflected thereby, said first and second bearings being urged in a direction along said axis toward said bearing retainer, said annular member at least partially defining a nonlinear spring, said nonlinear spring having the characteristic of a substantially constant force value corresponding to a range of different deflection values, whereby a constant preload can be exerted on said duplex bearings under varying amounts of tab deflection.

20. A duplex bearing mount for a rotary device, comprising:

a pair of duplex bearings each having an inner race and an outer race, said inner race disposed within said outer race and being rotatable relative thereto about an axis, said inner races and said outer races respectively engaged with each other along said axis;

a bearing retainer engaged with the outer race of one of said duplex bearings, movement of said duplex bearings in one direction along said axis being limited by said bearing retainer; and means for providing a substantially constant preload on said duplex bearings under varying amounts of displacement of said duplex bearings in directions along said axis.

* * * * *